United States Patent
Sanchez-Carrera et al.

(10) Patent No.: US 10,116,021 B2
(45) Date of Patent: Oct. 30, 2018

(54) STABLE ELECTROLYTE MATERIALS FOR LI-AIR BATTERY SYSTEMS

(75) Inventors: Roel S. Sanchez-Carrera, Cambridge, MA (US); Boris Kozinsky, Waban, MA (US); Timm Lohmann, Mountain View, CA (US); Paul Albertus, Mountain View, CA (US); John F. Christensen, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 258 days.

(21) Appl. No.: 13/616,320

(22) Filed: Sep. 14, 2012

(65) Prior Publication Data
US 2013/0095395 A1    Apr. 18, 2013

Related U.S. Application Data

(60) Provisional application No. 61/535,042, filed on Sep. 15, 2011.

(51) Int. Cl.
| H01M 12/08 | (2006.01) |
| H01M 8/00 | (2016.01) |
| H01M 10/052 | (2010.01) |
| H01M 10/0525 | (2010.01) |
| H01M 10/0569 | (2010.01) |
| H01M 12/06 | (2006.01) |

(52) U.S. Cl.
CPC ............ *H01M 12/08* (2013.01); *H01M 8/00* (2013.01); *H01M 10/052* (2013.01); *H01M 10/0525* (2013.01); *H01M 10/0569* (2013.01); *H01M 12/06* (2013.01)

(58) Field of Classification Search
CPC ........... H01M 2300/0014; H01M 2/08; H01M 10/052; H01M 10/0569; H01M 12/06; H01M 10/0525; H01M 4/24; H01M 4/48

USPC ....... 429/401, 402, 403, 404, 405, 535, 137, 429/163
See application file for complete search history.

(56) References Cited

U.S. PATENT DOCUMENTS

| 3,625,769 | A | | 12/1971 | Lyall | |
| 3,873,369 | A | * | 3/1975 | Kamenski | ................. 429/231.5 |
| 4,284,692 | A | * | 8/1981 | Rao et al. | ..................... 429/335 |
| 4,670,363 | A | * | 6/1987 | Whitney et al. | ............. 429/327 |
| 6,509,122 | B1 | * | 1/2003 | Oyama | ........................ 429/303 |
| 2002/0001748 | A1 | * | 1/2002 | Kamo | .................... H01M 4/58 |
| | | | | | 429/218.1 |

(Continued)

FOREIGN PATENT DOCUMENTS

| WO | 2008094206 A2 | 8/2008 |
| WO | 2011101992 A1 | 8/2011 |

OTHER PUBLICATIONS

Abraham et al., "A polymer electrolyte-based rechargeable lithium/oxygen battery," Journal of the Electrochemical Society; Jan. 1996; pp. 1-5; vol. 143(1).

(Continued)

*Primary Examiner* — Kenneth J Douyette
(74) *Attorney, Agent, or Firm* — Maginot Moore & Beck LLP (57) ABSTRACT

An electrochemical cell in one embodiment includes a first electrode, and a second electrode spaced apart from the first electrode, the second electrode including a substrate of active material, a form of lithium, and a solvent or electrolyte having an electrophilicity index value of less than or equal to 1.1 eV.

17 Claims, 6 Drawing Sheets

(56) References Cited

U.S. PATENT DOCUMENTS

| | | | |
|---|---|---|---|
| 2006/0078790 A1* | 4/2006 | Nimon et al. | 429/137 |
| 2007/0117007 A1 | 5/2007 | Visco et al. | |
| 2009/0053594 A1* | 2/2009 | Johnson et al. | 429/163 |
| 2009/0253036 A1* | 10/2009 | Owen et al. | 429/207 |
| 2011/0059355 A1 | 3/2011 | Zhang et al. | |

OTHER PUBLICATIONS

Armand et al., "Building better batteries," Nature; Feb. 7, 2008; pp. 652-657; vol. 451.

Beattie et al., "High-Capacity Lithium-Air Cathodes," Journal of the Electrochemical Society; 2009; pp. A44-A47; vol. 156(1).

Bryantsev et al., "Computational Study of the Mechanisms of Superoxide-Induced Decomposition of Organic Carbonate-Based Electrolytes," The Journal of Physical Chemistry Letters; 2011; pp. 379-383; vol. 2.

Christensen et al., "Cyclable lithium and capacity loss in Li-ion cells," Journal of the Electrochemical Society; 2005; pp. A818-A829; vol. 152(4).

Flandrois et al., "Carbon materials for lithium-ion rechargeable batteries," Carbon; 1999; pp. 165-180; vol. 37.

Kumar et al., "Investigating Li—O2 Electrochemistry Using Differential Electrochemical Mass Spectrometry (DEMS) and Surface Characterization Techniques," Abstract #405, 219th ECS Meeting, The Electrochemical Society; May 3, 2011; vol. MA2011-01.

Kumar et al., "A Solid-State, Rechargeable, Long Cycle Life Lithium-Air Battery," Journal of the Electrochemical Society; 2010; pp. A50-A54; vol. 157(1).

Laoire et al., "Influence of Nonaqueous Solvents on the Electrochemistry of Oxygen in the Rechargeable Lithium-Air Battery," Journal of Physical Chemistry C; May 20, 2010; pp. 9178-9186; vol. 114(19).

Mizuno et al., "Rechargeable Li-Air Batteries with Carbonate-Based Liquid Electrolytes," Electrochemistry; 2010; pp. 403-405; vol. 78(5).

Ogasawara et al., "Rechargeable Li2O2 Electrode for Lithium Batteries," Journal of the American Chemical Society; 2006; pp. 1390-1393; vol. 128(4).

Parr et al., "Electrophilicity Index," Journal of the American Chemical Society; 1999; pp. 1922-1924; vol. 121(9).

Read, "Characterization of the lithium/oxygen organic electrolyte battery," Journal of the Electrochemical Society; 2002; pp. A1190-A1195; vol. 149(9).

Read et al., "Oxygen transport properties of organic electrolytes and performance of lithium/oxygen battery," Journal of the Electrochemical Society; 2003; pp. A1351-A1356; vol. 150(10).

Sawyer et al., "How super is superoxide?" Accounts of Chemical Research; 1981; pp. 393-400; vol. 14(12).

Schmidt et al., "General atomic and molecular electronic structure system," Journal of Computational Chemistry; 1993; pp. 1347-1363; vol. 14(11).

Tarascon et al., "Issues and challenges facing rechargeable lithium batteries," Nature; Nov. 15, 2001; pp. 359-367; vol. 414.

Wagner et al., "Electrochemistry and the Future of the Automobile," The Journal of Physical Chemistry Letters; Jul. 15, 2010; pp. 2204-2219; vol. 1(14).

Xiao et al., "Investigation of the Rechargeability of Li—O2 Batteries in Non-Aqueous Electrolyte", Journal of Power Sources; 2011; pp. 5674-5678; vol. 196.

Xu et al., "Investigation on the charging process of Li2O2-based air electrodes in Li—O2 batteries with organic carbonate electrolytes," Journal of Power Sources; 2011, pp. 3894-3899; vol. 196.

Yang et al., "The effect of oxygen pressures on the electrochemical profile of lithium/oxygen battery," Journal of Solid State Electrochemistry; 2010; pp. 109-114; vol. 14.

International Search Report in corresponding PCT application (i.e., PCT/US2012/055364), dated Jan. 21, 2013 (11 pages).

Communication pursuant to Article 94(3) EPC corresponding to European Patent Application 12 769 241.6 (8 pages).

Freunberger, Stefan A. et al., "The Lithium-Oxygen Battery with Ether-Based Electrolytes", Angewandte Chemie International Edition, vol. 50, No. 37, Jul. 29, 2011 (5 pages).

* cited by examiner

STABLE ELECTROLYTE MATERIALS FOR LI-AIR BATTERY SYSTEMS

FIELD OF THE INVENTION

This patent relates generally to batteries and more particularly to lithium-air batteries.

BACKGROUND

Batteries are a useful source of stored energy that can be incorporated into a number of systems. Rechargeable lithium-ion ("Li-ion") batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (in Wh/kg) and energy density (in Wh/L) compared to batteries with conventional carbonaceous negative electrodes.

A typical Li-ion cell contains a negative electrode, a positive electrode, and an electrolyte or solvent that serves as a separator between the negative and positive electrodes. Typically, during charging, a given amount of electrons are generated at the positive electrode and an equal amount of electrons are consumed at the negative electrode; these electrons are transferred back and forth via an external circuit that connects the two electrodes. During discharging, the exact opposite electrochemical reactions occur.

Batteries with a lithium metal negative electrode afford exceptionally high specific energy (in Wh/kg) and energy density (in Wh/L) compared to batteries with conventional carbonaceous negative electrodes. See, e.g, Armand, M., et al., *Building Better Batteries;* Nature 451(7179): 652-657 (2008); Flandrois, S., et al, *Carbon Materials for Lithium-ion Rechargeable Batteries;* Carbon 37(2):165-180 (1999); and Tarascon, J. M. et al., *Issues and Challenges Facing Rechargeable Lithium Batteries;* Nature 14(6861): 359-367 (2001). Therefore, Li-based batteries are the most promising energy-storage technology for deployment in hybrid electric vehicles ("HEVs") and electric vehicles ("EV"). Although existing Li-ion batteries may satisfy the need for short-range electric vehicles; long-range (driving range above 300 miles) electric vehicles with a range approaching that of present day vehicles will require systems with increased energy densities. Wagner, F. T., et al., *Electrochemistry and the Future of the Automobile,* The Jour. of Physical Chemistry Letters, 2010. 1(14): p. 2204-2219.

In one of the earliest papers on the Li-air system, Abraham and Jiang used a $Li^+$ conductive organic polymer electrolyte and a positive electrode with an electronically conductive carbon matrix and containing a catalyst to aid with the reduction and oxidation reactions. Abraham, K. M., et al., *A Polymer Electrolyte-based Rechargeable Lithium/oxygen Battery;* Jour. of Electrochem. Soc., 143(1):1-5 (1996). Under these conditions, the concept of a nonaqueous rechargeable $Li/O_2$ battery was demonstrated. Over the course of the past ten years many more publications have investigated the Li-air system as a proposition of a high-energy rechargeable system for electric vehicle applications. See, e.g., Beattie, S. et al., *High-Capacity Lithium-Air Cathodes,* Jour. of Electrochem. Soc., 156: p. A44 (2009); Ogasawara, T., et al., *Rechargeable $Li_2O_2$ Electrode for Lithium Batteries,* Jour. of Electrochem. Soc., 128(4): 1390-1393 (2006); Kumar, B., et al., *A Solid-State, Rechargeable, Long Cycle Life Lithium-Air Battery;* Jour. of Electrochem. Soc. 157: 50 (2010).

However, at the present, there are still significant challenges that must be addressed for the Li-air system to become commercially viable. For example, Li-air batteries generally suffer degradation mechanisms that limit their useful life-cycle operation. Christensen, J., et al., *A Critical Review of Li/Air Batteries,* Jour. Electrochem. Soc. 2012, Volume 159, Issue 2, Pages R1-R30. Additional challenges include reducing the hysteresis between the charge and discharge voltages, limiting dendrite formation at the lithium metal surface, protecting the lithium metal (and possibly other materials) from moisture, and avoiding the formation of reaction by-products due to electrochemically-induced electrolyte decomposition reactions.

This challenge of avoiding the formation of reaction by-products due to electrochemically-induced electrolyte decomposition is of particular importance because it has recently been demonstrated that during discharge of a Li-air battery cell containing propylene carbonate (PC) as electrolyte, $Li_2CO_3$ is the primary product rather than $Li_2O_2$. Mizuno, F., et al., *Rechargeable Li-Air Batteries with Carbonate-Based Liquid Electrolytes;* Electrochem. Soc. of Japan, 78(5):403-405 (2010). The origin of the carbonate-based electrolyte decomposition has been hypothesized to occur due to the presence of superoxide ion $O_2^-$ species in the electrochemical environment of the Li-air battery systems Bryantsev, V. S., et al., *Computational Study of the Mechanisms of Superoxide-Induced Decomposition of Organic Carbonate-Based Electrolytes.;* The Jour. of Phys. Chem. Letters, 2: 379-383 (2011).

This species is a powerful reducing agent, which is thought to react very rapidly with a variety of organic substrates. See, e.g., Sawyer, D. T. et al., *How Super is Superoxide?;* Accts. of Chem. Res., 14(12): 393-400 (1981). Overall, these results point toward the irreversibility of carbonate-based electrolytes for Li-air cell batteries. As such, a battery having a solvent/electrolyte that resists breakdown by a superoxide ion would be greatly appreciated in the art.

SUMMARY

In accordance with at least one embodiment of the disclosure, a method of producing a Li-ion battery displaying increased resistance to nucleophilic attack is disclosed, with the method comprising: providing a first electrode, providing a second electrode spaced apart from the first electrode, and providing at least one electrolyte selected as having an electrophilicity index below 1.1 eV.

In accordance with at least one embodiment of the disclosure, a lithium-ion battery displaying increased resistance to nucleophilic attack is disclosed, the battery comprising: a first electrode, a second electrode spaced apart from the first electrode, an active material comprising lithium, and at least one electrolyte selected as having an electrophilicity index less than or equal to 1.1 eV. In at least one embodiment, the at least one electrolyte is selected from the group of: Tetramethyldiaminoethane (TMEDA), Hexamethylenebis (dimethylamine) (TMHD), Tetramethyltrimethylenediamine (TMPDA), Pentamethyldiethylenetriamine (PMDT), Triethylamine (Triethylamine), Dimethoxybenzene (DMB), Dibutyl sulfide (DBS), Hexamethylphosphoramide (HMPA), Tetrahydrothiopyran (THTP), Diethyl sulfide (DES), Tetrahydrothiophene (THT), Diisopropyl sulfide (DIS), Methyl phenyl ether (MPE), Tetramethylguanidine (TMG), Tetraethylurea (TEU), 12-Crown-4 ether (CE), Triethoxyphosphine (TEP), Dimethylpropyleneurea (DMPU), Dioxane (Dioxane), Tetramethylurea (TMU), Dimethyl imidazolidinone (DMI), Dimethyl disulfide (DMDS), N-Vinylpyrrolidone (NVP), Dimethoxydimethylurea (DMDMU), Dimethylthioformamide (DMTF), Diglyme (DG) Dimethoxyethane (DME), Tetramethylene sulfoxide (TMSO), Diethylacetamide (DEAC), N-Ethylpyrrolidone (NEP), Dimethyl sulfoxide (DMSO), and N-Methylpyrrolidone (NMP).

DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 1:
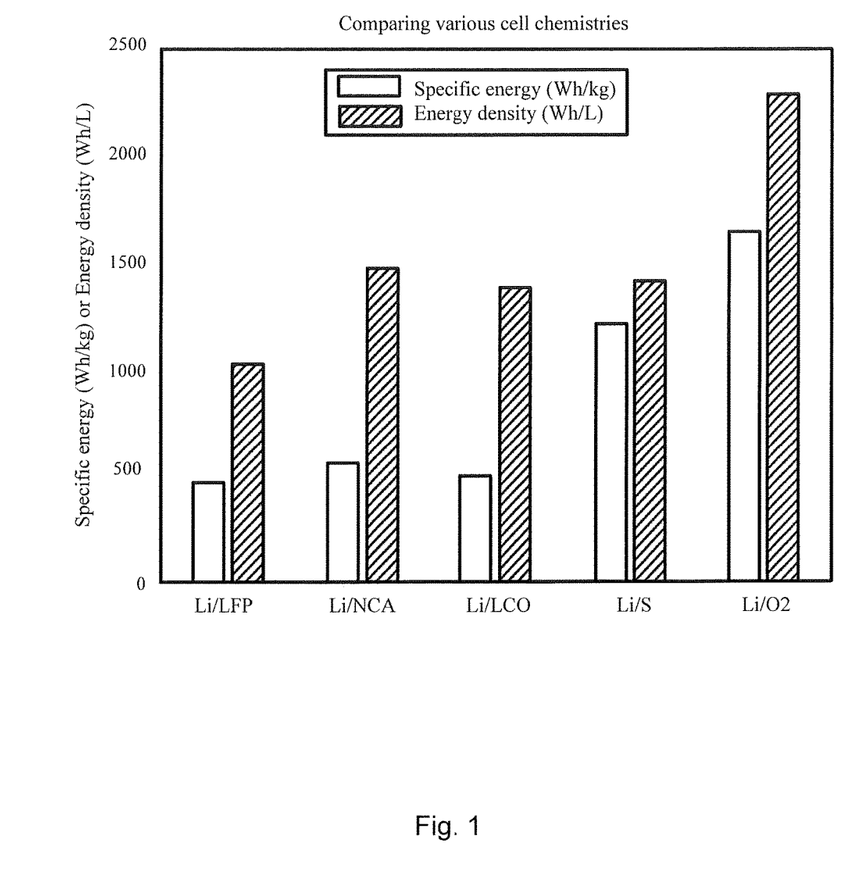
FIG. 1 depicts a schematic of comparison of the specific energy and energy density of several cell chemistries that use Li metal as the negative electrode.

FIG. 1 provides a comparison of the specific energy and energy density of several cell chemistries that use Li metal as the negative electrode, and shows a the significant theoretical advantage offered, by a Li-air system, compared with the lithium-ion cells with a conventional positive-electrode materials such as $Li_xCoO_2$ or $Li_xNi_{0.80}Co_{0.15}Al_{0.05}O_2$. As used in FIG. 1, LFP refers to $Li_xFePO_4$, NCA refers to $Li_xNi_{0.80}Co_{0.15}Al_{0.05}O_2$, LCO refers to $Li_xCoO_2$, and O2 refers to $O_2$. The numbers shown therein are figured at the cell level, which includes the weight of not just the active materials but also current collectors, binder, separator, and other electrochemically inert materials in the calculation. However, packaging weight such as tabs and the cell can are not included. Through the use of a lithium metal negative electrode and a positive electrode that electrochemically reduces the oxygen from air; the deployment of a fully integrated high-energy battery system for an electric vehicle is possible.

Figure 2:
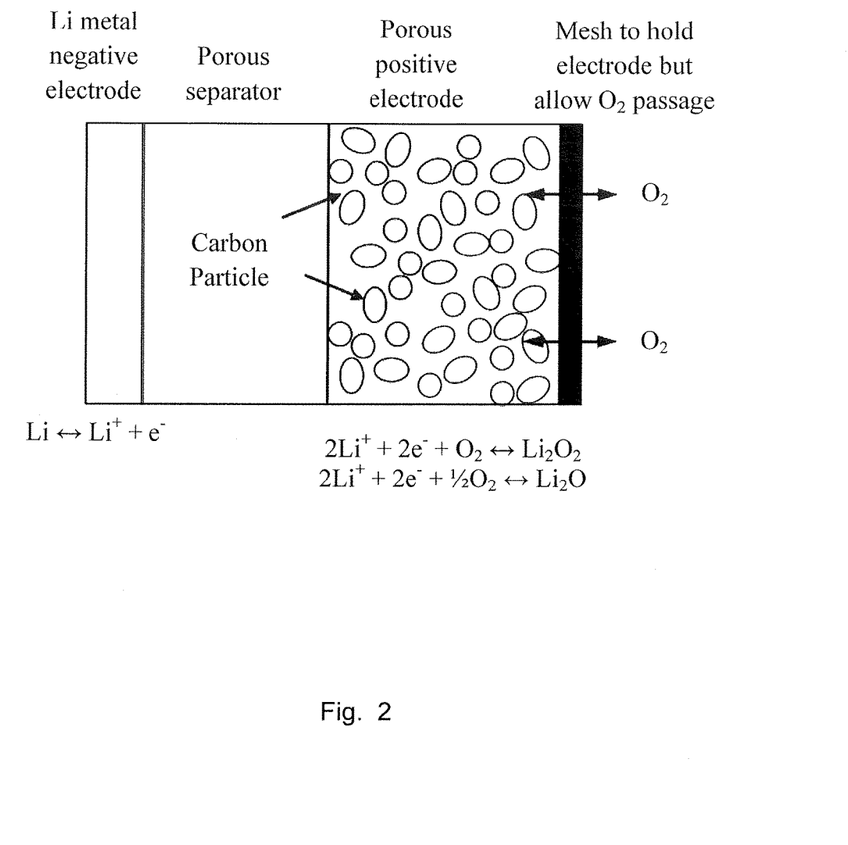
FIG. 2 depicts a schematic of an Li-air battery system according to at least one embodiment.

A schematic of a Li-air cell is shown in FIG. 2. Under the assumption that the main reaction product of the Li-air cell is $Li_2O_2$, several research groups have proposed that Li-air battery is a rechargeable system, in which the main reaction product produced during discharge ($Li_2O_2$) can be recharged to its principal components Li and $O_2$. The reactions that occur at each electrode are also shown in FIG. 2. As seen in FIG. 2, a Li-air cell includes a lithium metal negative electrode, a porous separator containing an organic electrolyte, a porous positive electrode containing electronically conductive, carbon particles, oxygen, and an organic electrolyte, and a mesh structure to contain the positive electrode while allowing the passage of oxygen (or air) to and from the electrode. At the negative electrode lithium metal is stripped or plated, while at the positive electrode the reactions have been theorized to involve $Li_2O_2$ and $Li_2O$.

However, the present disclosure relates to a significant variation on the lithium-air system, derived from the recognition that in carbonate-based electrolytes, $Li_2CO_3$ rather than $Li_2O_2$ or $Li_2O$ is the actual discharge product when $O_2$ is fed as a reactant. Specifically, the C in the $Li_2CO_3$ in such a system comes from the electrolyte, potentially as a result of reaction with some of the electrochemically formed species during discharge of the Li-air battery. Cycling of a Li-air cell in carbonate-based electrolytes therefore involves the repeated decomposition of the carbonate solvent, which in turn limits the number of electrochemical Li-air battery cycles.

As such, according to at least one embodiment, a Li-air cell utilizes a less reactive solvent or electrolyte that can tolerate the reactive electrochemical medium of the Li-air cell, and is characterized by a predetermined chemical reactivity level of the solvent or electrolyte in the presence of nucleophilic species, such as the superoxide ion, $O_2^-$. According to one embodiment, the chemical reactivity level of the solvent or electrolyte is characterized as having a predetermined electrophilicity index ("ω") as described in Parr, R. G., et al., *Electrophilicity Index*. Jour. of the American Chem. Soc., 121(9):1922-1924 (1999).

Further, according to at least one example, the electrophilicity index ("ω") provides information about the stabilization in energy when a chemical system acquires an additional electronic charge from the environment. In other words, the electrophilicity index ("ω") quantifies the tendency of a molecular structure to accept an electron from a generic donor (or nucleophile). Therefore, the higher the electrophilicity index, the greater the propensity of a chemical structure (or molecular complex) to attract electrons from a generic donor. As such, the structures of a given electrolyte or solvent for a Li-air cell should be able to resist (or avoid) the attack of the superoxide ion, $O_2^-$. Therefore, a Li-air cell according to the present disclosure utilizes an electrolyte having a predetermined electrophilicity index that is low. According to certain embodiments, a Li-air cell according to the present disclosure utilizes an electrolyte selected as having an electrophilicity index ("ω") less than or equal to 1.1 eV, less than or equal to 1.0 eV, less than or equal to 0.9 eV, less than or equal to 0.8 eV, less than or equal to 0.7 eV, or less than or equal to 0.6 eV. According to other embodiments, a Li-air cell according to the present disclosure utilizes an electrolyte selected as having an electrophilicity index ("ω") between about 0.9 eV and about 0.2 eV, between about 0.8 eV and about 0.3 eV, or between about 0.9 eV and about 0.4 eV.

EXAMPLES

Figure 3A:
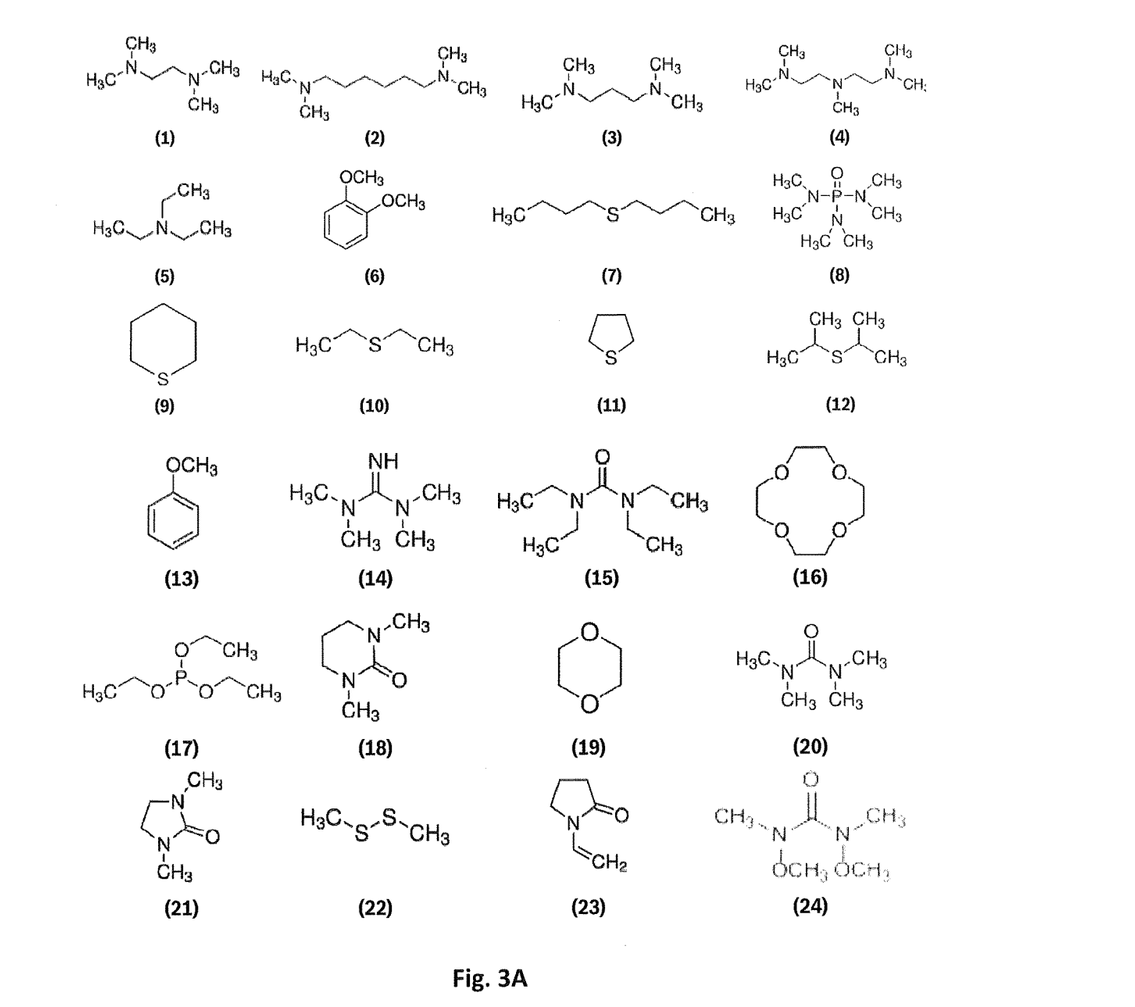
FIGS. 3A and 3B depict the chemical structures of several potential electrolytes evaluated according to at least one embodiment herein.
Figure 3B:
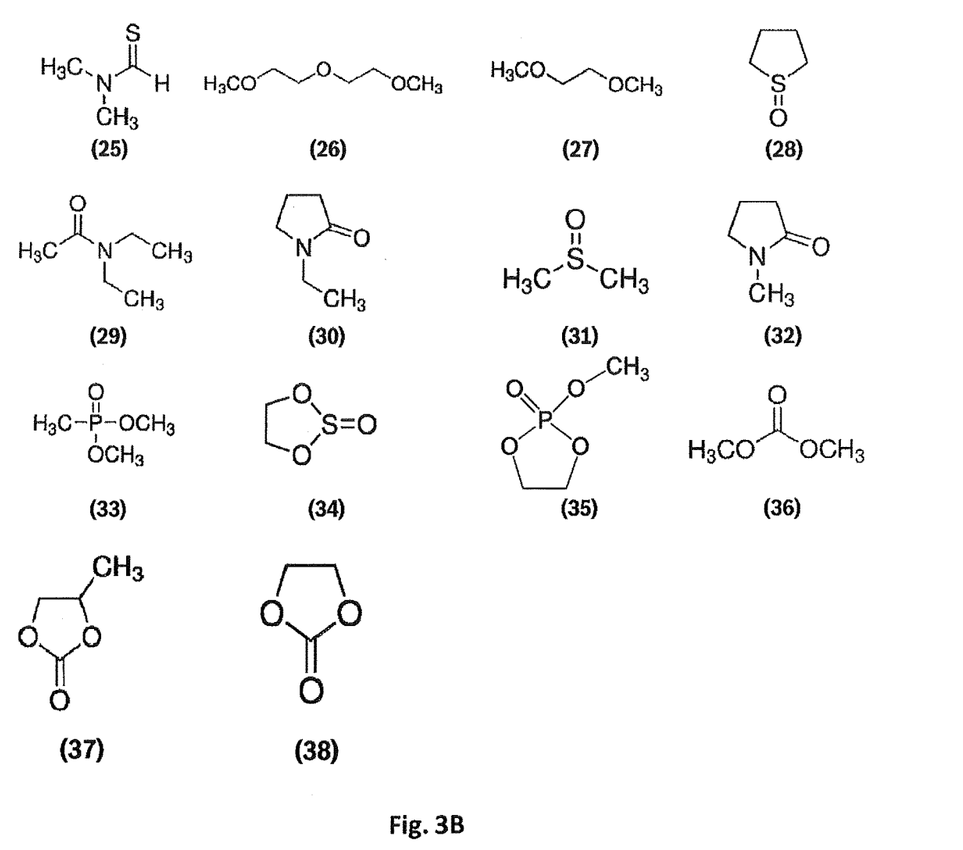
Figure 4:
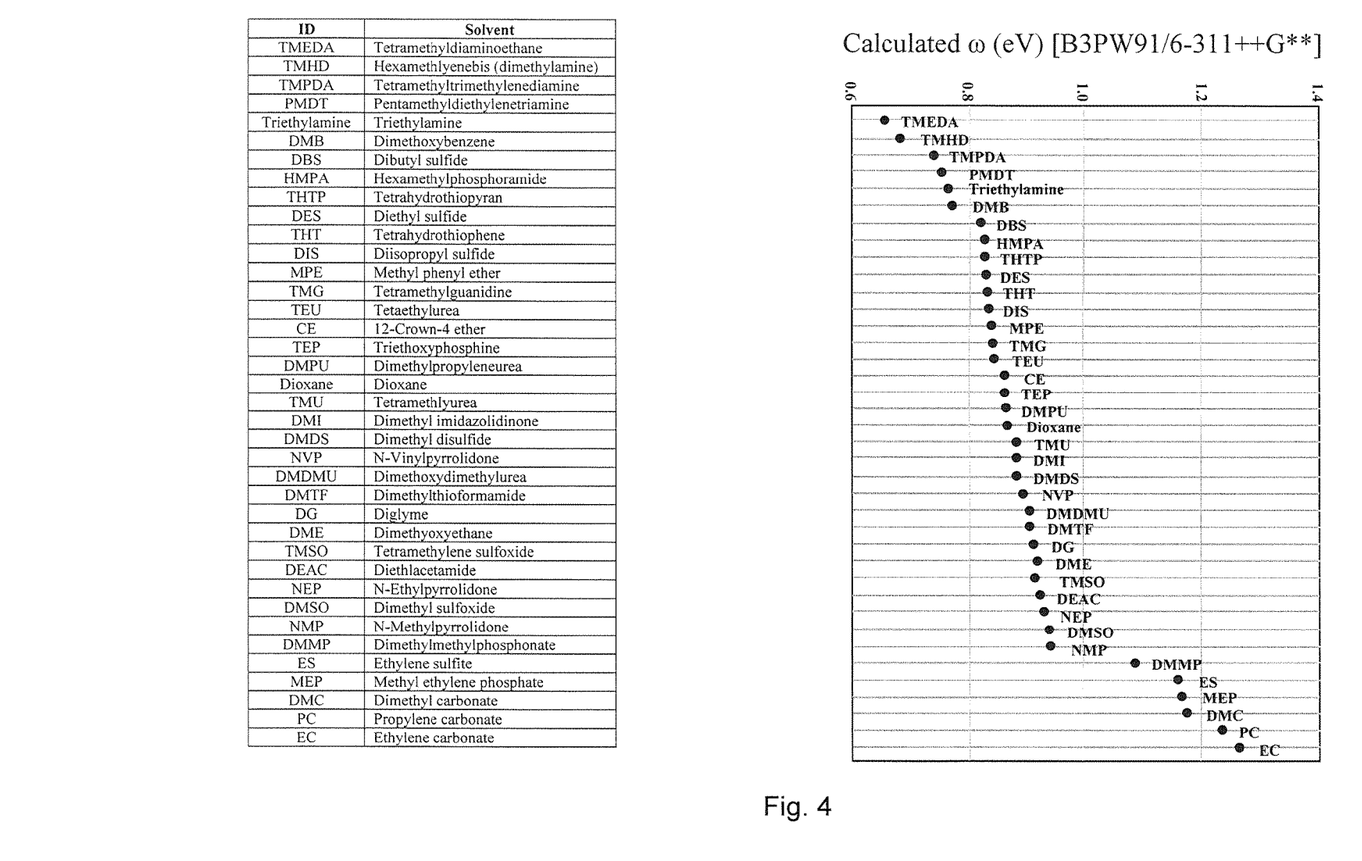
FIG. 4 depicts a graph showing the calculated electrophilicity index of the chemical structures shown in FIGS. 3A and 3B.

According to at least one exemplary embodiment, as shown in FIGS. 3A, 3B and 4, a comparative set of molecular structures used to investigate the applicability of the electrophilicity index (ω) as a chemical-reactivity descriptor is shown. The comparative set of molecular structures tested are displayed according to their structure in FIGS. 3A, and 3B, and includes typical Li-ion cell solvents and electrolytes including, propylene carbonate (PC), ethylene carbonate (EC), and dimethyl carbonate (DMC). Additionally, several uncommon electrolyte and solvent molecular structures for the Li-ion cells were investigated including Tetramethyldiaminoethane (TMEDA), Hexamethylenebis (dimethylamine) (TMHD), Tetramethyltrimethylenediamine (TMPDA), Pentamethyldiethylenetriamine (PMDT), Triethylamine (Triethylamine), Dimethoxybenzene (DMB), Dibutyl sulfide (DBS), Hexamethylphosphoramide (HMPA), Tetrahydrothiopyran (THTP), Diethyl sulfide (DES), Tetrahydrothiophene (THT), Diisopropyl sulfide (DIS), Methyl phenyl ether (MPE), Tetramethylguanidine (TMG), Tetraethylurea (TEU), 12-Crown-4 ether (CE), Triethoxyphosphine (TEP), Dimethylpropyleneurea (DMPU), Dioxane (Dioxane), Tetramethylurea (TMU), Dimethyl imidazolidinone (DMI), Dimethyl disulfide (DMDS), N-Vinylpyrrolidone (NVP), Dimethoxydimethylurea (DMDMU), Dimethylthioformamide (DMTF), Diglyme (DG), Dimethoxyethane (DME), Tetramethylene sulfoxide (TMSO), Diethylacetamide (DEAC), N-Ethylpyrrolidone (NEP), Dimethyl sulfoxide (DMSO), N-Methylpyrrolidone (NMP), Dimethylmethylphosphonate (DMMP), Ethylene sulfite (ES), Methyl ethylene phosphate (MEP), Dimethyl carbonate (DMC), Propylene carbonate (PC), and Ethylene carbonate (EC).

According to FIG. 4, the list of solvents or electrolytes tested is identified in the associated key, with the electrophilicity index of each plotted graphically as shown. In determining the electrophilicity indexes of the displayed solvents or electrolytes the following quantum chemistry calculations of the ground and charged states of the molecular structures were carried out with the GAMESS code, described at Schmidt, M. W., et al., *General Atomic and Molecular Electronic Structure System*, Jour. of Computational Chem., 14(11):1347-1363 (1993). The total energies of the molecular structures at their respective ground/charged states were used to compute the electrophilicity index, using the following formulas:

$$\mu = -\frac{IP_V + EA_V}{2} \quad (1)$$

$$\eta = IP_V - EA_V \quad (2)$$

$$\omega = \frac{\mu^2}{2\eta} \quad (3)$$

In Equations 1 and 2, $IP_V$ and $EA_V$ represent the vertical ionization potential and electron affinity, respectively. $IP_V$ and $EA_V$ were calculated at the B3PW91/6-311++G** level by using the geometry of the neutral system optimized at the same level of theory. Hence, the $IP_V$ and $EA_V$ determined by the reported quantum-chemistry method are the vertical ionization potential and vertical electron affinity, respectively ($IP_V=E(N-1)-E(N)$; $EA_V=E(N)-E(N+1)$, N being the total number of electrons of the ground state). The electronic chemical potential ($\mu$) and the chemical hardness ($\eta$) of each system are then computed from the $IP_V$ and $EA_V$, see Equations 1 and 2. Finally, the chemical potential and the chemical hardness are used to compute the electrophilicity index ($\omega$), as shown in Equation 3.

Continuing with FIG. 4, the calculated electrophilicity indexes for thirty-eight comparative molecular structures are shown. As evident from the results, the molecular structures of typical electrolytes used in Li-ion battery system, such as PC, EC, and DMC have relatively high electrophilicity indexes ($\omega>1.1$ eV) indicating that, according to the present embodiment, such solvents or electrolytes should not be selected for use as a solvent or electrolyte within a Li-air cell having increased resistance to nucleophilic attack. Additionally, it should be noted that those identified comparative values reflect our observations that PC, EC, and DMC are reactive with nucleophile species such as $O_2^-$; and that Li-air cells utilizing those solvents or electrolytes suffer degradation mechanisms that limit their useful life-cycle operation. However, as is also shown in FIG. 4, other identified molecular structures, including Tetramethyldiaminoethane (TMEDA), Hexamethylenebis(dimethylamine) (TMHD), Tetramethyltrimethylenediamine (TMPDA), Pentamethyldiethylenetriamine (PMDT), Triethylamine (Triethylamine), Dimethoxybenzene (DMB), Dibutyl sulfide (DBS), Hexamethylphosphoramide (HMPA), Tetrahydrothiopyran (THTP), Diethyl sulfide (DES), Tetrahydrothiophene (THT), Diisopropyl sulfide (DIS), Methyl phenyl ether (MPE), Tetramethylguanidine (TMG), Tetraethylurea (TEU), 12-Crown-4 ether (CE), Triethoxyphosphine (TEP), Dimethylpropyleneurea (DMPU), Dioxane (Dioxane), Tetramethylurea (TMU), Dimethyl imidazolidinone (DMI), Dimethyl disulfide (DMDS), N-Vinylpyrrolidone (NVP), Dimethoxydimethylurea (DMDMU), Dimethylthioformamide (DMTF), Diglyme (DG) Dimethoxyethane (DME), Tetramethylene sulfoxide (TMSO), Diethylacetamide (DEAC), N-Ethylpyrrolidone (NEP), Dimethyl sulfoxide (DMSO), and N-Methylpyrrolidone (NMP), display a relatively low electrophilicity index below the preselected level according to at least one embodiment ($\omega<0.95$ eV) and are less prone to favor chemical interactions with nucleophile species. As such, those molecular structures are solvents or electrolytes for use within a Li-air cell having increased resistance to nucleophilic attack according to at least one embodiment of the present application.

Figure 5:
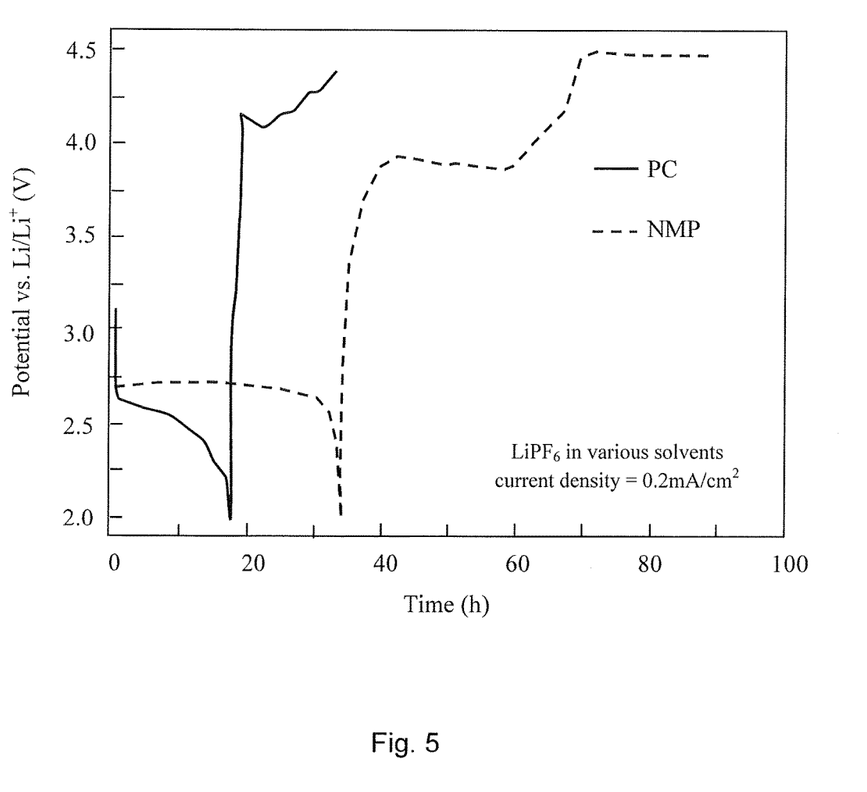
FIG. 5 graphically displays the performance difference of Li-air cells as a function of time when Li-air cells are produced with PC and NMP as an electrolyte or solvent.

Turning now to FIG. 5, the performance of two Li-air cells was experimentally evaluated in 2 different electrolytes: PC ($\omega>1.1$ eV) and NMP ($\omega<0.95$ eV). FIG. 5 graphically displays the performance difference of Li-air cells produced with an electrolyte or solvent selected according to at least one embodiment herein. It will be appreciated that the NMP solvent or electrolyte, selected for its electrophilicity index value below 1.1 eV, and in fact below 0.95 eV, significantly outperforms the other solvent (PC) identified above as having an electrophilicity index value above 1.1 eV in terms of both stability as function of time and reduced Li-air battery hysteresis behavior. Specifically, the calculated electrophilicity index for NMP is around 0.94 eV and that of the PC electrolyte is approximately 1.2 eV.

As such, according to at least one embodiment, an Li-ion battery comprises a first electrode, a second electrode spaced apart from the first electrode, an active material comprising lithium, and at least one electrolyte selected as having a electrophilicity index below a preselected value. According to certain embodiments, the preselected value of the electrophilicity index is less than or equal to 1.1 eV. According to certain embodiments, the preselected value of the electrophilicity index is less than or equal to 0.95 eV. According to certain embodiments, the preselected electrophilicity index is calculated according to one of the equations described herein.

The invention claimed is:
1. A method of producing a Li-ion battery displaying increased resistance to nucleophilic attack, the method comprising:
   a. providing a first electrode,
   b. providing a second electrode spaced apart from the first electrode, c. providing an electrolyte composition for the Li-ion battery, each chemical of the electrolyte composition having an electrophilicity index below 0.8 eV.

2. The method of claim 1, wherein the electrophilicity index is calculated according to the formula:

$$\omega = \frac{\mu^2}{2\eta},$$

where $\mu$ is the electronic chemical potential of the electrolyte and $\eta$ is the chemical hardness of the electrolyte.

3. The method of claim 2, wherein $$\mu = -\frac{IP_V + EA_V}{2}$$

and $\eta = IP_v - EA_v$, where $IP_v$ is the vertical ionization potential of the electrolyte and $EA_v$, is the electron affinity of the electrolyte.

4. The method of claim 1, wherein the at least one electrolyte is selected from one or more of the following chemicals: Tetramethyldiaminoethane (TMEDA), Hexamethylenebis (dimethylamine) (TMHD), Tetramethyltrimethylenediamine (TMPDA), Pentamethyldiethylenetriamine (PMDT), Triethylamine (Triethylamine), Dimethoxybenzene (DMB).

5. The method of claim 1, wherein the at least one electrolyte is selected as having an electrophilicity index between about 0.8 and 0.3 eV.

6. The method of claim 1, wherein the at least one electrolyte is selected such that the battery displays greater stability as function of time and reduced Li-air battery hysteresis behavior as compared to a battery using an electrolyte having an electrophilicity index above 1.1 eV.

7. The method of claim 5, wherein the at least one electrolyte is selected such that the battery displays greater stability as function of time and reduced Li-air battery hysteresis behavior as compared to a battery using an electrolyte having an electrophilicity index above 0.95 eV.

8. The method of claim 1, wherein the battery is a Li-air battery.

9. A Li-ion battery displaying increased resistance to nucleophilic attack, the battery comprising:

a. a first electrode,
b. a second electrode spaced apart from the first electrode,
c. an active material comprising lithium, and
d. an electrolyte composition for the Li-ion battery, each chemical of the electrolyte composition having an electrophilicity index below 0.8 eV.

10. The battery of claim 9, wherein the at least one electrolyte includes only one electrolyte.

11. The battery of claim 9, wherein the battery is a Li-air battery.

12. The battery of claim 9, wherein the at least one electrolyte is selected from one or more of the following chemicals: Tetramethyldiaminoethane (TMEDA), Hexamethylenebis (dimethylamine) (TMHD), Tetramethyltrimethylenediamine (TMPDA), Pentamethyldiethylenetriamine (PMDT), Triethylamine (Triethylamine), Dimethoxybenzene (DMB).

13. The battery of claim 9, wherein the at least one electrolyte is selected as having an electrophilicity index between about 0.8 and 0.3 eV.

14. The battery of claim 13, wherein the at least one electrolyte is selected such that the battery displays greater stability as function of time and reduced Li-air battery hysteresis behavior as compared to a battery using an electrolyte having an electrophilicity index above 0.95 eV.

15. The battery of claim 9, wherein the electrophilicity index is calculated according to the formula:

$$\omega = \frac{\mu^2}{2\eta},$$

where $\mu$ is the electronic chemical potential of the electrolyte and $\eta$ is the chemical hardness of the electrolyte.

16. The battery of claim 15, wherein $$\mu = -\frac{IP_V + EA_V}{2}$$

and $\eta = IP_v - EA_v$, where $IP_v$ is the vertical ionization potential of the electrolyte and $EA_v$ is the electron affinity of the electrolyte.

17. The method of claim 1, wherein the at least one electrolyte includes only one electrolyte.

* * * * *

UNITED STATES PATENT AND TRADEMARK OFFICE
CERTIFICATE OF CORRECTION

PATENT NO. : 10,116,021 B2
APPLICATION NO. : 13/616320
DATED : October 30, 2018
INVENTOR(S) : Sanchez-Carrera et al.

Page 1 of 1

It is certified that error appears in the above-identified patent and that said Letters Patent is hereby corrected as shown below:

In the Claims

In Column 7, Lines 22-23, Lines 4-5 of Claim 3 should read:
potential of the electrolyte and $EA_v$ is the electron affinity of the electrolyte.

Signed and Sealed this
Ninth Day of April, 2019

Andrei Iancu
*Director of the United States Patent and Trademark Office*